July 13, 1926.

1,592,705

H. PILOTY

CAMERA FOR MULTICOLOR PHOTOGRAPHY

Filed Nov. 21, 1925     2 Sheets-Sheet 1

Inventor
H. Piloty
by
Langner Parry and Langner
Attys.

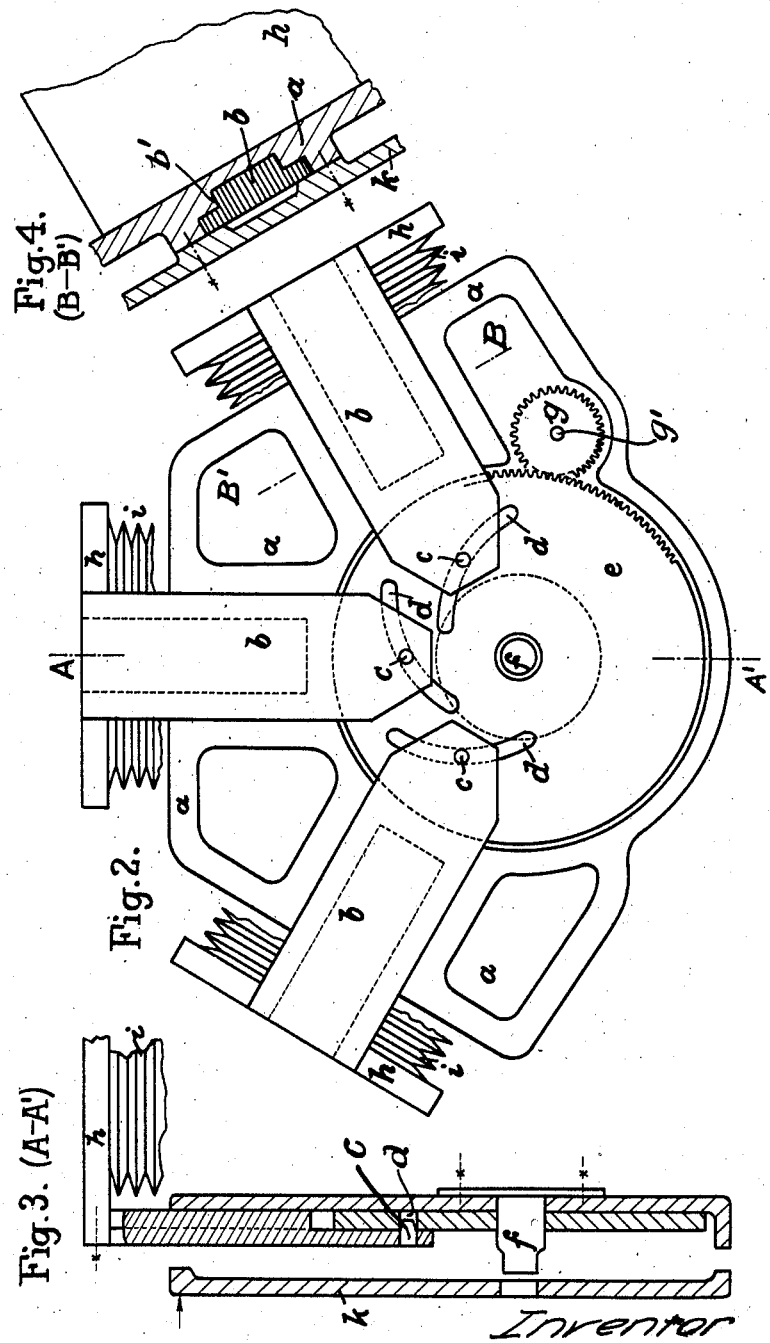

Patented July 13, 1926.

1,592,705

UNITED STATES PATENT OFFICE.

HANS PILOTY, OF BERLIN-WILMERSDORF, GERMANY, ASSIGNOR TO JOS-PE FARBEN-PHOTO GESELLSCHAFT MIT BESCHRANKTER HAFTUNG, OF HAMBURG, GERMANY.

CAMERA FOR MULTICOLOR PHOTOGRAPHY.

Application filed November 21, 1925, Serial No. 70,693, and in Germany November 26, 1924.

Among the cameras used for the simultaneous production of the partial negatives required for a photograph in natural colors are those in which the partial pictures are not presented on a common plate but in which, for example, three plates located in different planes are exposed simultaneously.

The subject of the present invention is a precision adjustment device for multiple color cameras, in which, in contrast with known devices, the precision adjustment is effected not by movement of the optical unit or lens system but by movement of the holders for the plate-receiving "slides". In this way the drawbacks experienced in cases where the optical unit is shifted relatively to the light-splitting device are avoided. These drawbacks reside mainly in the variation of the proportions of the distribution of the light, and, in certain circumstances in loss of sharpness when the optical unit is shifted. In the construction according to the invention the optical unit and light-splitting device remain stationary while the holders for the plate-receiving "slides" are shifted in the paths of the rays as split, so that the drawbacks aforesaid are avoided.

Movement of the plates individually by hand is not practicable. On the contrary a device which depends on movement of the plates to effect precision adjustment in multiple color cameras must answer the essential requirement that the plates are positively moved simultaneously equal amounts. If, however, as is absolutely essential in three color photography, the lens is powerful or the light is at all intensive and if there are used comparatively short focal lengths in relation to the size of the picture, as usual in photography, there are considerable obstacles to the obtainment of this simultaneous movement. These obstacles stand in the way of obtainment of the necessary exactitude with which the plates must be brought into the position required by the geometry of the arrangement. If the degree of exactitude obtained is inadequate, perfect registration of the partial pictures is not obtained even if the optical system in itself furnishes partial pictures free from registration defects. This exactitude, which is not customarily required in the manufacture of cameras, necessitates positive simultaneous displacement of the plates in equal amounts without play; also, the position of the plates relatively to one another, which is maintained throughout all such displacements, must be settable once and for all.

The invention provides a device which answers these requirements. In the said device the holders for the plate-receiving "slides" are slidably mounted in a rigid part of the casing or camera structure and are moved inwards or outwards simultaneously by a common adjusting member. The holders which are connected with the casing by bellows are preferably adjustably mounted on slide-blocks which are movable on the base plate of the casing and have followers engaging a cam presenting cam slots and rotatable either directly or through transmission gearing. The slide blocks and cam are fitted on the under side of the base plate and are covered by a removable guard plate so as to be readily accessible.

In the accompanying drawings which illustrate by way of example an embodiment of the invention—

Fig. 2 is an inverted plan of the base of the camera, the guard plate being removed;

Fig. 3 is a fragmentary section on the line A—A' of Fig. 2;

Figure 1:
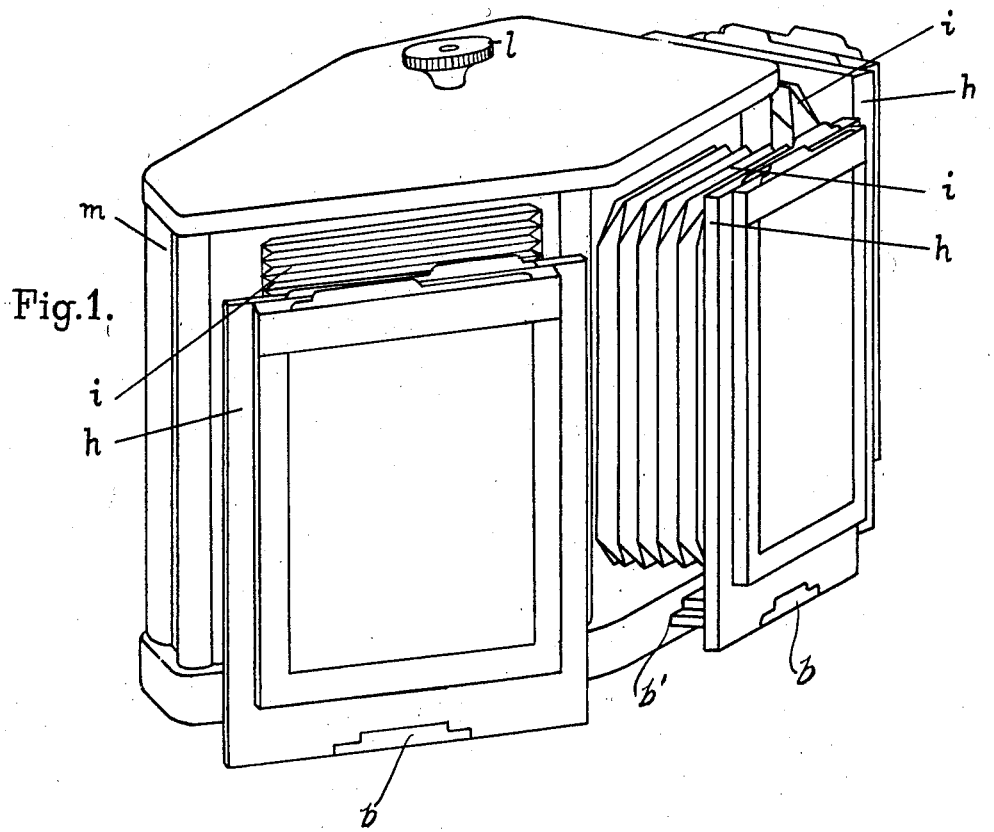
Fig. 1 is an outside view of the camera in parallel projection.

Fig. 4 a fragmentary section on the line B—B' of Fig. 2.

As shown, the slide holders $h$ are connected with the casing of the camera $m$ by means of bellows $i$ and are mounted adjustably on slide blocks $b$ guided in three grooves $b'$ of prismatic cross-section in the base-plate $a$. Each of these slide-blocks is equipped at its inner end with a stud $c$ fitting an arcuate slot $d$ in a cam disc $e$, so that the studs can move without play in the respective slots $b$. Also the slide blocks are fitted so exactly in their slide ways that play is practically avoided. The cam disc $e$ is rotatable around the center pin $f$ and is toothed at its periphery for engagement by a pinion $g$ carried on a shaft $g'$, which carries on the top of the camera (Fig. 1) a knob $l$ for turning the same. The slide blocks $b$ and the cam disc $e$ are located on the under side of the base plate and are covered by a detachable guard plate $k$ having connectors $f$ so as to be accessible on removal of the guard plate.

I claim:

1. A precision adjusting device for multicolor photographic cameras of the type in which several plates in different planes are exposed comprising a casing, slide holders, bellows connecting the slide holders with the casing, slide blocks on which the slide holders are mounted, rigid guides on the base plate of the casing between which said slide blocks are adapted to move, a rotatable cam disc provided with arcuate slots, followers mounted on the said slide blocks and engaging the said arcuate slots, means to rotate said cam disc to simultaneously reciprocate said slide blocks.

2. A precision adjusting device according to claim 1, characterized in this that the means to rotate said cam disc consist of teeth on the edge of the disc and a pinion engaging said teeth of the cam disc and a spindle on which said pinion is mounted and which carries a handle to manually rotate the cam disc.

3. A precision adjusting device according to claim 1 characterized in that the slide blocks and the cam are mounted on the under side of the casing and covered by a removable guard plate.

In testimony whereof I have signed my name to this specification.

HANS PILOTY.